Sept. 22, 1942.	H. E. HRUSKA	2,296,282
CLUTCH CONTROL MECHANISM
Filed April 2, 1941	3 Sheets-Sheet 1

INVENTOR
HOWARD E. HRUSKA
BY
H. O. Clayton
ATTORNEY

Sept. 22, 1942. H. E. HRUSKA 2,296,282
CLUTCH CONTROL MECHANISM
Filed April 2, 1941 3 Sheets-Sheet 2

INVENTOR
HOWARD E. HRUSKA
BY
ATTORNEY

Sept. 22, 1942.   H. E. HRUSKA   2,296,282
CLUTCH CONTROL MECHANISM
Filed April 2, 1941    3 Sheets-Sheet 3

INVENTOR
HOWARD E. HRUSKA
BY
ATTORNEY

Patented Sept. 22, 1942

2,296,282

UNITED STATES PATENT OFFICE 2,296,282

CLUTCH CONTROL MECHANISM

Howard E. Hruska, South Bend, Ind., assignor to Bendix Aviation Corporation, South Bend, Ind., a corporation of Delaware Application April 2, 1941, Serial No. 386,407

6 Claims. (Cl. 192—.01)

This invention relates in general to power operated mechanism for actuating a friction clutch in the power plant of an automotive vehicle, said plant being provided with a three-speeds forward and reverse transmission and with a fluid clutch located between the internal combustion engine of the vehicle and the friction clutch.

One of the principal objects of the invention is to provide in such a power plant a friction clutch operated power means operative to effect a disengagement of the friction clutch when the accelerator is released and the vehicle is at a standstill and to then effect a smooth engagement of the friction clutch when the vehicle is being started in any setting of the aforementioned transmission. For example, should the vehicle be started with the transmission in either high gear or second gear the power means of my invention will so control the engagement of the friction clutch as to effect, in cooperation with the fluid clutch, a smooth start of the vehicle, the fluid clutch being subjected to a minimum of slipping.

Yet another object of my invention is to provide a simple, compact and effective pressure differential operated and controlled power unit for effecting an operation of a friction clutch.

A further object of my invention is to provide a pressure differential operated clutch operating power unit, the clutch engaging operation of said unit being controlled by two pressure differential operated valves, one of said valves being operative to effect a relatively fast movement of the power element of the unit which movement is automatically terminated when the clutch plates contact at a predetermined load and the other of said valves being operative to effect a relatively slow movement of said power element, the rate of said latter movement being in direct proportion to the gaseous pressure within the intake manifold of the internal combustion engine.

The principal object of my invention is to provide, in a power plant for an automotive vehicle including an internal combustion engine and a selective gear transmission, clutch and clutch operating mechanism for coupling the engine with the transmission, said mechanism cooperating with the remainder of the power plant to effect a smooth start of the vehicle without danger of stalling the engine irrespective of the initial gear ratio setting of the transmission. The clutch and clutch operating mechanism of my invention also insure a smooth recoupling of the engine with the transmission during the operation of shifting the gears of the transmission as the vehicle is getting under way.

Yet another object of my invention is to provide a clutch and clutch operating mechanism including a fluid coupling, said mechanism being so constructed as to facilitate a demeshing of the transmission gears as the transmission is being operated.

Another object of my invention is to provide, in the power plant of an automotive vehicle, a coupling mechanism interconnecting the internal combustion mechanism and a selective gear transmission, said coupling mechanism including a fluid clutch and being so constructed as to disconnect the transmission from the fluid clutch when the car is brought to a standstill.

A further object of my invention is to provide a power plant in an automotive vehicle, said plant including a fluid clutch or so-called fluid coupling and further including a power operated friction clutch supplementing the fluid clutch in such a manner as to eliminate the objectionable features of the fluid clutch and retain all of its desirable features.

A further object of my invention is to provide, in an automotive power plant comprising an internal combustion engine, a selective gear transmission capable of being manually operated and a propeller shaft, means for effecting a smooth start of the vehicle irrespective of the setting of said transmission and for effecting a subsequent transmission of power from the engine to the propeller shaft without jerking the vehicle and without unduly speeding up the engine. Yet another object of my invention is to so construct and arrange the parts of this power plant as to control the same, under all normal driving conditions solely by the operation of the accelerator.

Other objects of the invention and desirable features will be apparent from the following detailed description of one embodiment of my invention, taken in conjunction with the accompanying drawings illustrating said embodiment, in which.

Figure 1:
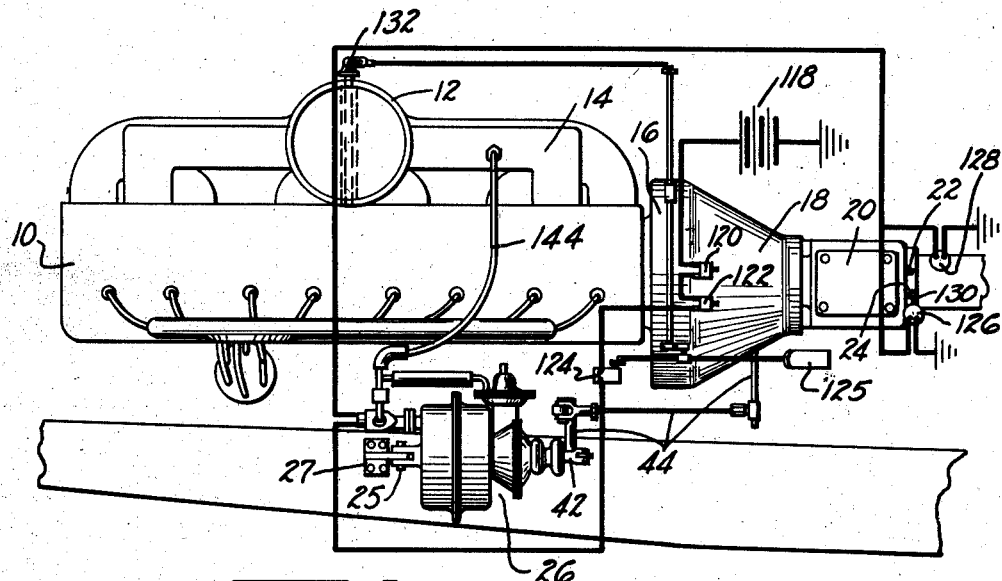
Figure 1 is a plan view of that portion of the power plant of an automotive vehicle which constitutes my invention.
Figure 5:
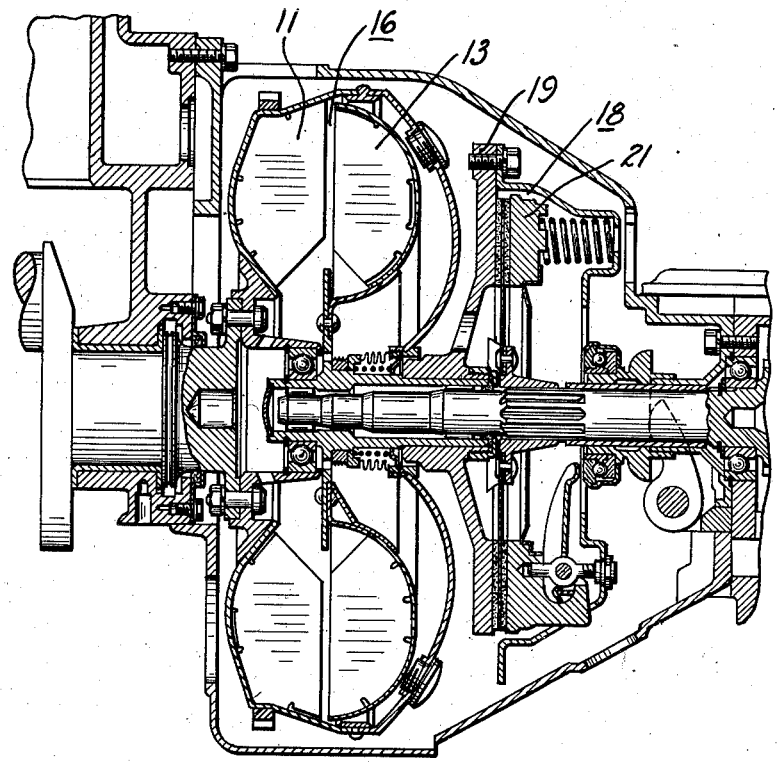
Figure 5 is a sectional view of a fluid clutch and a friction clutch which elements, together with the vacuum operated motor unit, constitute the principal elements of my invention.

Referring now to Figure 1 disclosing a preferred embodiment of the power plant constituting my invention, there is provided an internal combustion engine 10 of conventional construction including a carburetor 12 and an intake manifold 14. To the crankshaft of the engine there is connected a fluid clutch 16 of standard present-day construction, that is, said clutch includes an impeller 11 and a rotor 13, Figure 5, housed within a casing, said casing also housing a power fluid such as oil which constitutes the force transmitting medium of said clutch. As disclosed in Figure 5, the impeller of the fluid clutch is connected to the drive shaft of the engine and the rotor of said clutch is connected by suitable shafting to the driving clutch plate 19 of a standard present-day friction clutch 18, the driven clutch plate 21 of said clutch being connected to a manually operated three-speeds forward and reverse selective or so-called step transmission 20 which is also of standard construction. The transmission 20 may, however, not be limited to a three-speeds forward and reverse transmission, but may be any type of manually operated selective transmission, such, for example, as a four-speeds forward and reverse selective transmission having shift rails. The three-speeds forward and reverse transmission disclosed in Figure 1 includes a low and reverse shift rail 22 and a high and second shift rail 24, the ends of said rails being disclosed in said figure.

Figure 2:
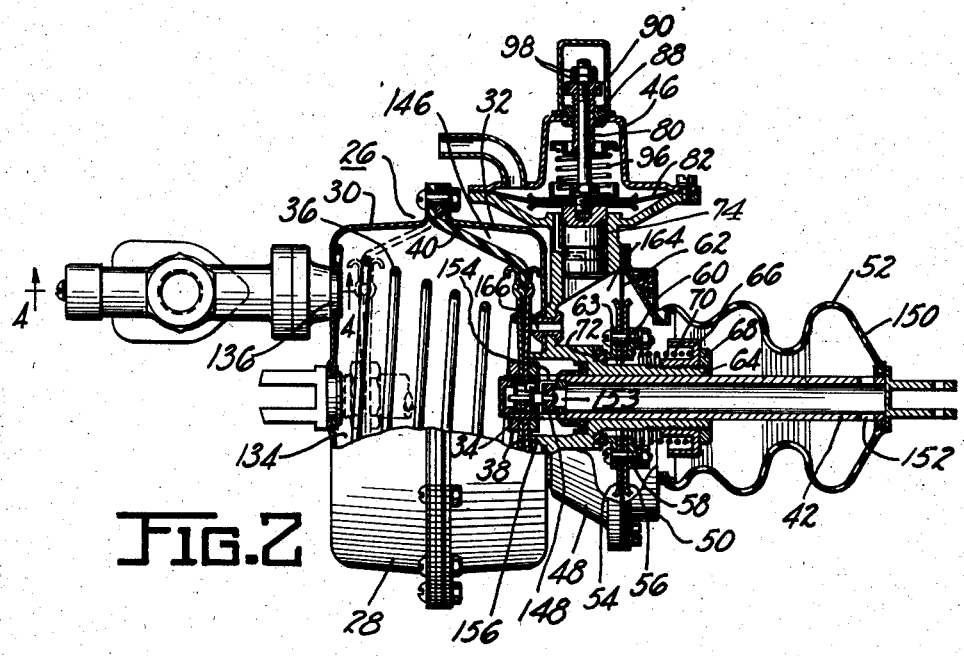
Figure 2 is a sectional view of the friction clutch operating vacuum operated motor unit of my invention.

My invention is directed to the friction clutch operating motor unit 26 disclosed in detail in Figure 2 and to the combination of said unit with the manually operated selective transmission 20 and the fluid clutch 16, the latter being placed between the friction clutch 18 and the internal combustion engine 10. As disclosed in Figure 1, the motor unit is pivotally secured at 25 to a support 27 secured to the chassis of the vehicle.

Describing now in detail the motor unit 26, the same comprises a motor 28 including casing members 30 and 32 to which members there is secured a power element 34 biased to its clutch engaged position by a spring 36. The power element 34 is shown in this position in Figure 2. To the power element, which includes metal plates 38 and a flexible ring 40, there is adjustably secured a tubular connecting rod 42 which rod is connected by force transmitting connections, such as cranks and links 44 to the driving clutch plate of the friction clutch 18.

A pressure differential operated valve mechanism for controlling a so-called two-stage clutch engaging operation of the motor unit 26 is housed within a valve casing comprising members 46, 48 and 50. A flexible boot 52 secured to the casing member 50 and to the connecting rod 42, serves to prevent the entrance of foreign matter, such as dirt or moisture which would foul the valve mechanism.

That portion of the valve mechanism operating to effect the first stage of the clutch engaging operation of the motor unit includes metal rings 54, 56 and 58 clamped by bolts 60 to a flexible diaphragm 62 which diaphragm is fixedly secured at its outer periphery to the casing members 48 and 50. The bolts 60 also serve to clamp a valve member 63 to the said rings and diaphragm. The valve casing member 48 is provided with a two-diametered tubular extension 64 sleeved over the connecting rod 42 and to the end of said extension there is threadedly secured a nut 66 and a lock nut 68. A spring 70 sleeved over the extension 64 is interposed between the nut 66 and the ring 58, said spring serving to force the valve member 63 into abutment with a ring 72 of rubber or rubberized material, said ring being embedded within the extension 64. The members 54, 56, 58, 62 and 63 together constitute a spring and pressure differential operated valve member which seats upon the ring 72 to close the valve.

Describing now the valve mechanism for controlling the second stage of the clutch engaging operation of the motor unit, there is provided a cylindrically shaped bleed valve plunger member 74 reciprocably mounted within a tubular shaped casing portion 76 of the valve casing member 48. This bleed valve member 74 and the mechanism for operating the same is disclosed in detail in Figure 3, said member being provided with an annularly extending cut-away portion or recess 78. The upper end of the valve member 74 is secured by a bolt 80, to a flexible diaphragm 82, said diaphragm being secured in place between metal plates 84 and 86. To the upper end of the valve casing member 46 there is secured a bushing 88 within which is tightly fixed a tubular sleeve 90. To the end of the sleeve 90 there is secured a cup-shaped stamping 92, which serves, together with a cup-shaped stamping 94, to retain in position a valve operating spring 96. The upper end of the bolt 80 slides within the sleeve 90, the degree of movement of the bolt being determined by nuts 98 threaded on the end of said bolt. The lower end of the bolt 80 is threaded into the top of the valve member 74 and serves to clamp the members 82, 84, 86 and 94 to said valve member. The lowermost position of the bolt, and the diaphragm 82 and valve 74 secured thereto, is determined by the position of the nuts 98 on the bolt 80, for in their lowermost position the nuts 98 contact the top of the sleeve 90.

Figure 4:
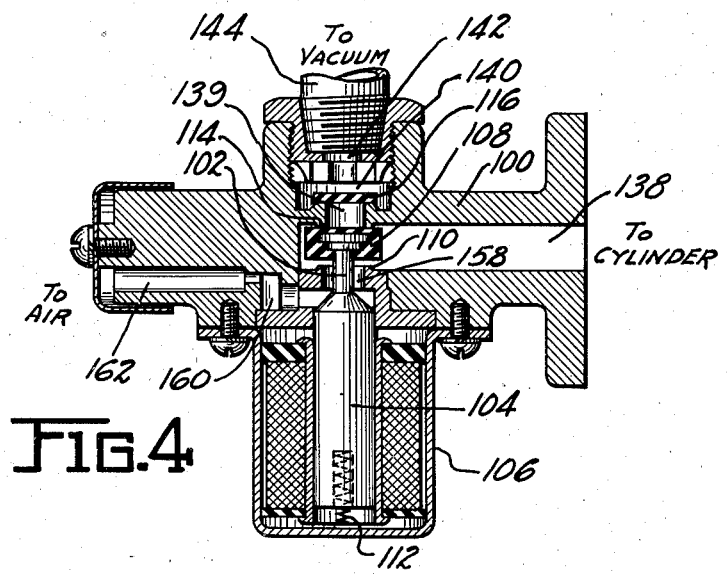
Figure 4 is a sectional view, taken on the line 4—4 of Figure 2, disclosing in detail the solenoid operated three-way control valve of said motor unit.

A solenoid operated three-way valve for initiating the clutch engaging and disengaging operations of the motor unit is disclosed in detail in Figure 4. This valve includes a casing member 100 fixedly secured to the motor unit 26, said casing member being ported, as disclosed in said figure, to provide air transmitting connections with the atmosphere, the motor unit and a source of vacuum, preferably the intake manifold 14 of the internal combustion engine 10 of the vehicle. The movable element of the valve includes a member 102 secured to the upper end of an armature 104 of a solenoid 106 which is secured to the valve casing. A block 108 of rubber or equivalent material is secured to the member 102, said block constituting a valve member seatable upon a valve seat 110 to open the valve when the solenoid is energized. When the solenoid is deenergized a spring 112 expands, thereby closing the valve by seating the valve member 108 upon a seat 114 which position of the valve is disclosed in Figure 4. The spring 112 is housed within a recess in one end of the armature 104 and contacts the end wall of the solenoid. A small rubber disk 116 serves as a check valve to automatically seat, and thereby close the connection with the intake manifold, when for any reason the manifold vacuum is destroyed when the friction clutch is being held in its disengaged position by the unit 26.

Describing the power means for operating the valve 108, the solenoid 106 is wired in series with a battery 118, the ignition switch 120 of the car, a manually operated cut-out switch 122 which may be mounted on the instrument panel, a cut-out switch 124 operated by the accelerator 125 and a high and second gear shift rail operated cut-out switch 126. A cut-out switch 128, operated by a vehicle speed responsive governor, is wired in series with these switches, the cut-out switches 126 and 128 being wired in parallel with each other in the electrical circuits, all as disclosed in Figure 1.

The cut-out switch 128 is closed by the vehicle speed responsive governor, not shown, when the speed of the car is below a predetermined value and it follows that this cut-out switch is opened when the speed of the vehicle equals or exceeds this predetermined value. The second and high gear shift rail switch 126 is closed at all times except when the transmission is established in high gear, for in moving to its high gear position said rail contacts a crank 130 and moves the same to open said switch. The cut-out switch 122 is included in the electrical circuit so that the driver may at any time disable the friction clutch operating power means, that is, cut the same out of operation. As to the accelerator operated cut-out switch 124, this switch is opened during the first increment of movement of the accelerator as the same is depressed to open the throttle. During this movement lost motion in a pin and slot lost motion connection 132 is taken up and further depression of the accelerator serves to open the throttle, that is open the butterfly valve of the carburetor to speed up the internal combustion engine.

Describing now the operation of the mechanism constituting my invention, it will be assumed that the car is at a standstill and that the accelerator is released to idle the engine and close the switch 124. Now, when the engine is idling there is created, by virtue of the pumping action of the pistons of the engine, a partial vacuum in the intake manifold 14 of said engine. The ignition switch 120 and the cut-out switch 122 are at the time closed as is the governor operated cut-out switch 128, for the latter switch is opened only when the vehicle is traveling at or above a certain speed, say 7 M. P. H.

The switches 120, 122, 124, 126 and 128 being closed, the solenoid 106 is, of course, energized resulting in the armature 104 being moved downwardly, Figure 4, the valve member 108 then seating upon the seat 110. A compartment 134 of the motor unit 26 is then placed in air transmitting connection with the intake manifold 14 via a port 136 in the motor casing member 30, a duct 138 in the valve casing 100, a duct 139, a chamber 140 and a port 142 in said casing and a conduit 144. The motor unit 26 is then energized, for the power element 34 of said unit is then subjected to a differential of pressures resulting in its movement to the left, to the dotted line position disclosed in Figure 2, to disengage the clutch, for the gaseous pressure in the compartment 134 is relatively low and the gaseous pressure in a compartment 146 of the motor unit is atmospheric. Explaining the fact that the compartment 146 is at atmospheric pressure when the power element 34 moves to the left, a spring loaded check valve 148 housed within the tubular connecting rod 42, is by virtue of the differential of pressures to which it is subjected, moved to the left to unseat the valve and thereby provide an air transmitting connection between the atmosphere and the compartment 146 via an opening 150 in the boot 52 and openings 152, 153 and 154 in the hollow connecting rod 42. The power element 34 is moved away from its abutment with the end 156 of the member 64 immediately after air is withdrawn from the compartment 134, thereby providing an access of air into the compartment 146 from the aforementioned openings 154, 153, 152 and 150. The compartment 146 being vented to the atmosphere and the compartment 134 being partially evacuated, it follows that the differential of pressures to which the power element 34 is subjected will result in movement of said element to the left.

The clutch having been disengaged, the transmission is then probably placed in low gear preparatory to starting the vehicle. The accelerator is then depressed, the switch 124 being opened during the first increment of its movement and before the throttle is opened. With an opening of the switch 124 the solenoid 106 is deenergized resulting in an expansion of the spring 112 to close the valve 108, that is, seat said valve upon the valve seat 114. This operation of the valve results in a venting of the compartment 134 of the unit 26 via duct 138, a duct 158 and ducts 160 and 162, all as disclosed in Figure 4.

Describing now the most important feature of my invention, that is the means for effecting the so-called two-stage engagement of the friction clutch in synchronization with the operation of the fluid clutch, air is dumped into the compartment 134 of the motor unit, this operation having been just described. The clutch springs of the friction clutch, not shown, immediately expand and in expanding move the driving clutch plate toward the driven clutch plate at a relatively high rate of speed. The air is then forced or rather pushed out of the compartment 146 and into a compartment 164 via ducts 166 in the wall separating compartments 164 and 146. The air within the compartment 164 is thus slightly compressed, that is, the gaseous pressure within said compartment is above atmospheric. This slight superatmospheric pressure within the compartment 164 results in a valve opening movement of the valve member 63, that is, the moving of the member 63 to the right and away from the ring 72. The spring 70 is so compressed, by regulating the position of the nuts 66 and 68 on the extension 64, as to insure a relatively tight seating of the valve members 63 upon the ring 72. The loading of the spring 70 is, however, so regulated as to result in a further compression of said spring to unseat the valve when the pressure within the compartment 164 is above atmospheric as just described. So long as the valve member 63 remains in its open position air passes out of the compartment 146 through said valve and out to the atmosphere via the opening 150 in the boot 52.

Now the relatively fast movement of the power element 34 automatically terminates when the driving and driven clutch plates contact with one another at a predetermined load, for when this happens the movement of said power element is appreciably decelerated. Explaining this operation in greater detail the gaseous pressure within the compartments 146 and 164 is, as described above, above atmospheric until the clutch plates contact and as a result of said contacting of the plates and the resultant resistance to motion of the piston 40, air continues to rush out of the aforementioned compartments until the gaseous pressure within the compartment 164 is reduced sufficiently to make possible the expansion of the spring 70 to close the so-called first stage valve 63. As described above, the compressed spring 70 tends to move the valve 63 to the left, Figure 2, to seat the valve and the pressure differential to which the diaphragm 62 is subjected tends to move the valve 63 to the right to unseat the same; accordingly, when the gaseous pressure within the compartment 164 is sufficiently reduced the valve 63, under the action of the spring 70, is seated. The gaseous pressure within the compartments 164 and 146 is, of course, in large measure determined by the size of the orifice or orifices through which the air from said compartments escapes when the clutch is being engaged and also by the force tending to move the diaphragm 40 to the right, Figure 2; and this force is in large measure the resultant of the loading effect of the clutch spring and the resistance to motion encountered when the clutch plates contact with one another.

It follows therefore that the loading of the valve spring 70 may be so adjusted as to result in a termination of the relatively fast first stage of movement of the driving clutch plate when the desired loading of the clutch plates has been effected. The parts of the mechanism of my invention including the length of the slot in the lost motion connection 132 are preferably constructed and arranged to effect the ending of this first stage of clutch engagement just before the accelerator, when depressed in the normal manner, has moved sufficiently to begin an opening of the throttle, and the adjustment of the spring 70 is preferably such that the fluid clutch cooperates with the friction clutch and change speed transmission to effect a smooth start of the vehicle in any setting of the transmission.

After the valve member 63 is seated, that is after the clutch plates have contacted at a predetermined load, the continued movement of the driving clutch plate is controlled by the movement of the valve member 74, for when the valve member 63 is seated there is no egress of air from the compartment 164 via said member and continued movement of the driving clutch plate can only be effected by providing another escape for the air from said compartment. However, means is provided for such escape, for as disclosed in Figure 3, the valve member 74 is provided with a right angled duct 168 leading to the recess 78.

It is to be remembered, however, that in describing the clutch engaging cycle of operations of the mechanism constituting my invention, the throttle has not yet been opened. Accordingly, the gaseous pressure within the intake manifold is relatively low and this results in the diaphragm member 82, Figure 3, being subjected to a differential of pressures of sufficient magnitude to compress the spring 96 and move the valve member 74 to the position disclosed in said figure. In this position, the recess 78 is positioned out of registry with the lower end 170 of a duct 172 interconnecting a compartment 174 within the tubular portion 76 and the compartment 164 below the valve member 74. Explaining the pressure differential to which the diaphragm 82 is subjected the upper surface of said diaphragm is subjected to a gaseous pressure equal to that of the intake manifold, for the valve casing member 46 is placed in air transmitting connection with the manifold via conduit 144 and a conduit 176 connected to the conduit 144. The gaseous pressure within the compartment 174 is at all times atmospheric or substantially so inasmuch as this compartment is vented to the atmosphere by a port 178 in the portion 76 of the valve casing.

Figure 3:
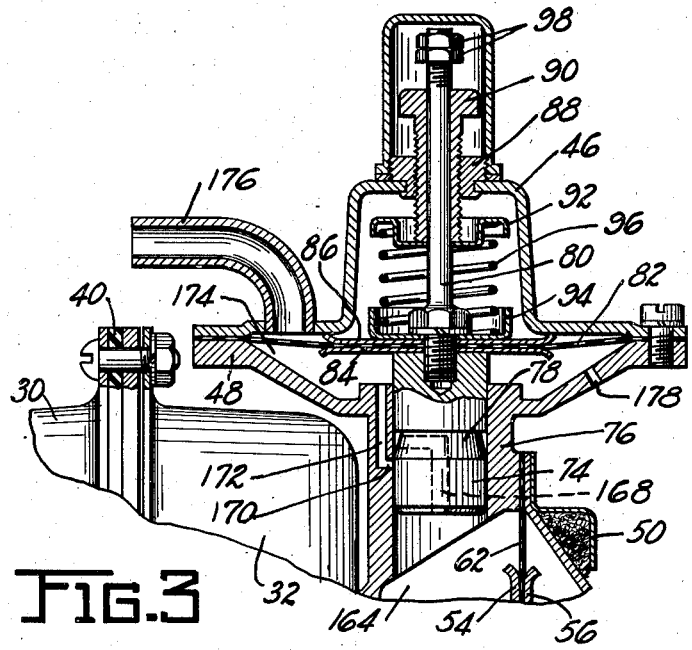
Figure 3 is a sectional view of the manifold vacuum operated bleed valve of the motor unit disclosed in Figure 2.

Accordingly, with the throttle closed and the engine idling the diaphragm 82 is moved to the position disclosed in Figure 3 to completely close the bleed valve 74.

Continuing the description of the cycle of operations in getting the vehicle under way, further movement of the accelerator serves to open the throttle, thereby increasing the driving torque of the internal combustion engine. The speed of the impeller of the fluid clutch and the engine crank shaft connected therewith is increased with a depression of the accelerator and the speed of the crank shaft and degree of opening of the throttle in large measure determines the degree of gaseous pressure of the intake manifold. The degree of gaseous pressure, that is degree of vacuum of the intake manifold, determines the position of the valve member 74 within the portion 76 of the casing member 46, for as manifold vacuum is decreased by opening the throttle, the vacuum above the diaphragm 82 is decreased, thereby reducing the differential of pressures to which said diaphragm is subjected. This action results in an expansion of the spring 96 to move the valve member 74 downwardly and it follows that the degree of said movement is directly proportional to the degree of manifold vacuum.

Now, the rate of egress of air from the compartment 146 is determined by the position of the valve member 74 within the casing portion 76, for as just described, with a depression of the accelerator the manifold vacuum is decreased resulting in a downward movement of said valve member to register the recess 78 with the port 170.

If the accelerator is depressed only slightly, that is such a limited amount as to open the throttle only a slight amount, then the valve member 74 is moved downardly but a short distance. The recess 78 then overlaps the port 170; however, the orifice provided by this overlapping of the parts is of such a relatively small cross sectional area that the rate of egress of air from the compartment 146 is relatively low. Accordingly, the rate of movement of the driving clutch plate, as it continues its so-called second stage movement into engagement with the driven clutch plate, is also relatively low.

From the above description of the operation of the clutch controling motor unit 26 it follows that the rate of movement of the driving clutch plate of the friction clutch 18 varies with the depression of the accelerator, said rate increasing as the accelerator is depressed. If the driver of the vehicle leaves the transmission in high gear after the vehicle is brought to a stop then the fluid clutch cooperates with the multi-stage clutch engaging operation of the motor unit 26 in effecting a smooth start of the vehicle, for despite a limited depression of the accelerator to open the throttle the engine will not choke. The engine torque may be relatively low; however, the fluid clutch will prevent the engine from choking inasmuch as said clutch will slip, that is the impeller and rotor of the clutch will move relative to each other. This slipping of the fluid clutch will, however, be at a minimum inasmuch as the clutch plates of the friction clutch are at the time being so loaded as to minimize the resistance to movement of the rotor of the fluid clutch.

There is thus provided a power plant in an automotive vehicle including means for effecting a smooth start of the vehicle despite the setting of the change-speed transmission. And if the driving conditions become abnormal, for example, if a start is to be made with the vehicle mired in sand or mud, then the transmission may be placed in second gear and the accelerator then slowly depressed. The progressively increasing loading of the clutch plates of the friction clutch cooperating with the slipping fluid clutch, all effected after the clutch plates are quickly brought into contact with each other, effects a smooth start of the vehicle with a minimum loss of energy. Under all normal driving conditions the transmission may be left in high gear; accordingly, to start, stop and control the speed of the vehicle the driver merely has to operate the accelerator and brake pedal, for the friction clutch is automatically disengaged and engaged should the vehicle be started from a standing start in low gear and then shifted from low to second gear and then from second gear to high gear. And with the mechanism of my invention the friction clutch is automatically disengaged when the vehicle is brought to a stop. If the friction clutch were not disengaged the vehicle might creep, due to the driving action of the fluid clutch when the engine is idling.

While one illustrative embodiment has been described, it is not my intention to limit the scope of the invention to that particular embodiment, or otherwise than by the terms of the appended claims.

I claim:

1. In an automotive vehicle having in its power plant an accelerator and a friction clutch, said clutch comprising a driving plate and a driven plate, power means for moving said driving plate away from and into engagement with said driven plate, said power means comprising a pressure differential operated motor unit, said unit including a power element operably connected with the driven clutch plate, a three-way valve serving when operated to initiate either a clutch disengaging or a clutch engaging operation of the motor unit, a solenoid for operating said valve, a switch, operated by accelerator operated linkage, for in part controlling the operation of said solenoid and valve means for controlling the clutch engaging operation of said motor unit including a pressure differential and spring operated valve, a spring for in part controlling the operation of said valve the latter being operative when said spring expands to terminate one phase of the clutch engaging operation of said motor and further including a pressure differential operated bleed valve for controlling another phase of the clutch engaging operation of said motor unit, said latter valve being operated by a pressure differential operated diaphragm, one side of said diaphragm being placed in fluid transmitting connection with the intake manifold of the internal combustion engine of the vehicle.

2. In an automotive vehicle provided with a friction clutch and an internal combustion engine, clutch operating mechanism comprising a two-compartment pressure differential operated motor unit, a three-way valve mounted on one end of the unit and operable to control the ingress and egress of air into and from one compartment of said unit and valve mechanism mounted on the other end of said unit, said latter valve mechanism serving to control the rate of egress of air from the other compartment of the motor unit and comprising a valve, a pressure differential operated diaphragm for in part operating said valve and a spring for in part operating said valve the latter being operable, when the spring expands to close the valve to substantially cut down the rate of egress of air from the last mentioned compartment and further comprising a pressure differential operated bleed valve operable in accordance with the gaseous pressure within the intake manifold of the internal combustion of the vehicle.

3. Friction clutch operating mechanism comprising a double-ended motor unit including a two-part casing, a power element within said casing, a connecting rod secured to said power element and extending through one part of the casing and valve mechanism for controlling the gaseous pressure within the ends of the motor unit and thereby controlling its operation of disengaging the clutch and controlling the engagement thereof, said valve mechanism including a check valve mounted within one end of the connecting rod and operating to facilitate the clutch disengaging movement of the power element of the motor unit, a bleed valve casing mounted on one end of the aforementioned two-part casing, a spring and pressure differential operated valve mounted within said bleed valve casing and another spring and differential operated valve mounted within said bleed valve casing, said latter valve serving, in accordance with the gaseous pressure within the intake manifold, to determine the rate of egress of air from one end of the motor unit after the driving and driven friction elements of the clutch are in contact with each other.

4. In an automotive vehicle provided with an accelerator and a friction clutch having a driving clutch plate and a driven clutch plate, power means operative to disengage the clutch by moving the driven clutch plate away from the driving clutch plate and operative to so control the engagement of the clutch, that is, control the movement of the driven clutch plate and its engagement with the driving clutch plate, as to effect a relatively fast movement of the driven clutch plate as it moves into engagement with the driving clutch plate and then effect a relatively slow movement of the driven clutch plate as it moves into closer contact with the driving clutch plate, said power means including a pressure differential operated motor unit having a plurality of compartments, a power operated three-way valve rendered operative during the first increment of movement of the accelerator pedal from its released position, to initiate a clutch engaging operation of the motor unit, a valve casing mounted on one end of the motor unit and valve means housed within said latter casing and operative to control the clutch engaging operation of the motor unit, said valve means comprising a valve member and a spring loaded valve operating member, the valve casing being so constructed as to provide, together with the valve operating member, a compartment to receive air forced out of one of the aforementioned compartments.

5. In an automotive vehicle having in its power plant an accelerator, a friction clutch and a fluid clutch including a driving member and a driven member, said friction clutch comprising a driving plate and a driven plate, power means for moving said driven plate away from and into engagement with said driving plate, said power means comprising a pressure differential operated motor unit, said unit including a power element operably connected with the driven clutch plate, a three-way valve for in part controlling the operation of the motor unit, a solenoid for operating said latter valve, a switch operated by accelerator operated linkage for in part controlling the operation of said solenoid and other means for in part controlling the clutch engaging operation of said motor unit, said means including a pressure differential and spring operated valve, a spring for in part operating said valve the latter being operative, when the spring expands to close the valve, to terminate one phase of the clutch engaging operation of said motor, said other means further including a bleed valve for controlling another phase of the clutch engaging operation of said motor unit as the accelerator is depressed to control the operation of said latter valve and to increase the speed of the driven element of the fluid clutch.

6. In an automotive vehicle provided with an internal combustion engine, an accelerator for controlling the operation of the engine, a fluid clutch and in part controlling the operation of a friction clutch operated power means, means interconnecting the accelerator with the carburetor of the engine, a change speed transmission, a friction clutch including a driving plate and a driven plate connected to the transmission, a fluid clutch including an impeller connected to the crank shaft of the engine and a rotor connected to the driving plate of the friction clutch, power means for operating the friction clutch comprising a pressure differential operated motor and means for controlling the operation of said motor including valve means, controlled in part by the accelerator, for effecting a multi-stage clutch engaging operation of said motor and further including a three-way valve and a solenoid for operating said valve and means for controlling the operation of said solenoid including an accelerator operated switch and a switch associated with the change speed transmission the parts of the aforementioned mechanism, including the connection between the throttle valve of the carburetor and the accelerator, being adapted to effect the second stage operation of the friction clutch operating motor, to progressively increase the loading of the driven clutch plate upon the driven clutch plate, as the accelerator is being depressed to open the throttle of the carburetor to speed up the rotation of the rotor of the fluid clutch the opening of said throttle being delayed until the aforementioned second stage operation is initiated.

HOWARD E. HRUSKA.